US006603900B1

(12) United States Patent
Bookbinder et al.

(10) Patent No.: US 6,603,900 B1
(45) Date of Patent: Aug. 5, 2003

(54) ATHERMAL OPTICAL WAVEGUIDE GRATING DEVICE

(75) Inventors: Dana C. Bookbinder, Corning, NY (US); Joel P. Carberry, Horseheads, NY (US); Paul S. Danielson, Corning, NY (US); Steven E. DeMartino, West Elmira, NY (US); Henry E. Hagy, Painted Post, NY (US); Brent M. Wedding, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/427,431

(22) Filed: Oct. 26, 1999

Related U.S. Application Data

(60) Provisional application No. 60/107,381, filed on Nov. 6, 1998.

(51) Int. Cl.[7] .................................................. G02B 6/34
(52) U.S. Cl. ........................................ 385/37; 385/137
(58) Field of Search .......................... 385/37, 123–124, 385/141, 136, 137, 41–42, 24, 31, 147

(56) References Cited

U.S. PATENT DOCUMENTS

| 3,445,212 A | 5/1969 | Bishop et al. |
| 3,498,876 A | 3/1970 | Baak et al. |
| 3,779,781 A | 12/1973 | Baak et al. |
| 4,209,229 A | 6/1980 | Rittler |
| 4,562,161 A | 12/1985 | Mennemann et al. |
| 4,725,110 A | 2/1988 | Glenn et al. |
| 4,778,242 A | 10/1988 | Ota et al. |
| 4,830,448 A | 5/1989 | Okazaki et al. |
| 4,865,414 A | 9/1989 | Ohta et al. |
| 5,007,705 A | 4/1991 | Morey et al. |
| 5,042,898 A | 8/1991 | Morey et al. |
| 5,104,755 A | 4/1992 | Taylor et al. |

(List continued on next page.)

FOREIGN PATENT DOCUMENTS

| EP | 480186 | 9/1991 |
| EP | 553492 | 12/1992 |
| EP | 812810 | 6/1997 |
| EP | 828169 | 9/1997 |
| WO | WO 97/26572 | 7/1997 |
| WO | WO 97/31869 | 9/1997 |
| WO | WO 98/17968 | 4/1998 |
| WO | WO 98/27446 | 6/1998 |

OTHER PUBLICATIONS

European Search Report for application No. EP 97 10 8750.
Daniel et al., "A Glass Solder Process for Packaging Fibre Optic Components", EFOC & N '94, pps. 126–129.
Chang et al., "Condensed Phase Relations in the Systems $ZrO_2$—$WO_2$—$WO_3$ and $HfO_2$—$WO_2$—$WO_3$", Journal of The American Ceramic Society, vol. 50, pps. 211–215.
Mary et al., "Negative Thermal Expansion from 0.3 to 1050 Kelvin in $ZrW_2O_8$", Science, vol. 272, Apr. 5, 1996, pps. 90–92.
Yoffe et al., "Temperature–compensated optical–fiber Bragg gratings" OFC'95 Technical Digest, W14, pps. 134–135.
Weidman et al., "A Novel Negative Expansion Substrate Material for Athermalizing Fiber Bragg Gratings", ECOC '96, Osio, pps. 61–64.

(List continued on next page.)

*Primary Examiner*—Frank G. Font
*Assistant Examiner*—Michael P. Mooney
(74) *Attorney, Agent, or Firm*—Svetlana Z Short; Kevin A. Oliver (57) ABSTRACT

The invention relates to an athermal optical waveguide grating device. The optical waveguide grating device includes a fiber Bragg grating secured and bonded to a supporting substrate member with a low thermal expansion securing glass, such as a copper alumino silicate glass. The inventive devices and method of making the devices include the utilization of intermediate solid insert members between the fiber and a negative thermal expansion substrate.

46 Claims, 6 Drawing Sheets

U.S. PATENT DOCUMENTS

| | | |
|---|---|---|
| 5,243,680 A | 9/1993 | Soane |
| 5,246,890 A | 9/1993 | Aitken et al. |
| 5,281,560 A | 1/1994 | Francis et al. |
| 5,305,336 A | 4/1994 | Adar et al. |
| 5,367,589 A | 11/1994 | MacDonald et al. |
| 5,426,714 A | 6/1995 | Gadkaree et al. |
| 5,469,520 A | 11/1995 | Morey et al. |
| 5,470,804 A | 11/1995 | Morena |
| 5,500,917 A | 3/1996 | Daniel et al. |
| 5,514,360 A | 5/1996 | Sleight et al. ............... 423/593 |
| 5,602,949 A | 2/1997 | Epworth |
| 5,658,364 A | 8/1997 | DeVore et al. |
| 5,682,453 A | 10/1997 | Daniel et al. |
| 5,694,503 A * | 12/1997 | Fleming et al. ................ 385/37 |
| 5,721,802 A | 2/1998 | Francis et al. |
| 5,757,540 A | 5/1998 | Judkins et al. |
| 5,926,599 A * | 7/1999 | Bookbinder et al. ......... 385/137 |
| 6,122,430 A * | 9/2000 | Bookbinder et al. ......... 385/137 |
| 6,269,207 B1 * | 7/2001 | Carberry et al. .............. 385/37 |
| 6,430,350 B1 * | 8/2002 | Bookbinder et al. ......... 385/136 |

OTHER PUBLICATIONS

Matusita et al., "Low Expansion Copper Aluminosilicate Glasses", Journal of Non–Crystalline Solids 30 (1979), pps. 285–292.

Matusita et al., "Thermal Expansion of Substituted Copper Aluminosilicate Glasses", Journal of the American Ceramic Society, vol. 66, No. 1 (1983), pps. 33–35.

Yoffe et al. "Temperature–compensated optical–fiber Bragg gratings", OFC '95 Technical Digest, W14, pps. 134–135.

Matusita et al. "Low Expansion Copper Aluminosilicate Glasses", Journal of Non–Crystalline Solids 30 (1979) pps. 285–292.

Matusita et al. "Thermal Expansion of Substituted Copper Aluminosilicate Glasses" Journal of the American Ceramic Society vol. 66, No. 1, pps. 33–35.

Weidman et al. "A Novel Negative Expansion Substrate Material for Athermalizing Fiber Bragg Gratings" $22^{nd}$ ECOC '6 Osio, pps. 61–64.

Daniel et al. "Reliability of Passive Optical Components", EFOC & N '94 (Jun. 22–24, 1994) pps. 126129.

US Application SN 60/012,330 Filed Feb. 27, 1996.

Boyd et al. "Glass–Ceramics" Encyclopedia of Chemical Technology Fourth Edition, vol. 12, pps. 627–644.

* cited by examiner

ATHERMAL OPTICAL WAVEGUIDE GRATING DEVICE

This application is based upon the provisional application Ser. No. 60/107,381, filed Nov. 6, 1998, which we claim as the priority date of this application.

FIELD OF INVENTION

The present invention relates to optical waveguide grating devices. Such a device comprises an optical waveguide, such as an optical fiber, in which a grating has been formed in order to affect the optical characteristics of the waveguide. The invention is especially suited for providing an athermalized optical waveguide grating wherein temperature varying properties are controlled.

BACKGROUND OF THE INVENTION

The central wavelength of optical waveguide grating devices such as a fiber Bragg grating can be altered by changing the temperature of the optical waveguide fiber Bragg grating. The central wavelength can also be altered by changing the stress/strain in the fiber that contains the Bragg grating. To minimize any undesired wavelength shifts due to temperature variations the fiber Bragg grating device can be rigidly attached, under appropriate tension, to a substrate material having a suitable negative coefficient of thermal expansion. Low softening temperature phosphate glass frits which have been filled with a pyrophosphate glass-ceramic have been used to attach fibers to negative expansion beta-eucryptite substrates. The inventors have discovered that such frits, while operable, may develop stresses due to expansion differences during the process steps of making a device which may lead to a stress build up in the components that may be undesirable.

SUMMARY OF THE INVENTION

Accordingly, the present invention is directed to an optical waveguide device that substantially obviates one or more of the problems due to limitations and disadvantages of the related art. The present invention provides an improved athermal optical waveguide grating device.

In one aspect, the invention is directed to improvements which reduce stress build up caused by differential expansion of components during manufacture and subsequent use.

Additional features and advantages of the invention will be set forth in the description which follows, and in part will be apparent from the description, or may be learned by practice of the invention. The objectives and other advantages of the invention will be realized and attained by the apparatus, process, and compositions particularly pointed out in the written description and claims hereof, as in well as the drawings.

To achieve these and other advantages, and in accordance with the purpose of the invention, as embodied and broadly described, the invention comprises an optical waveguide device which includes an optical waveguide grating member held under tension, which is secured to a supporting member such that the supporting member reduces the tension that the grating member is held under in relationship to a temperature increase of the device, with the grating member secured to the supporting member with a securing glass having a linear coefficient of thermal expansion ranging from $1\times10^{-7}/°$ C. to $10\times10^{-7}/°$ C. in the temperature range of $0°$ C. to $300°$ C.

In another aspect, the invention includes an athermalized optical waveguide device which includes an optical waveguide reflective Bragg grating member and a negative thermal expansion support member with the grating member secured to the support member with a copper alumino silicate glass.

In an additional aspect, the invention comprises an optical waveguide device which includes a negative thermal expansion longitudinal body substrate with a first end, and a second distal end distal (at a distance) from the first end, with the substrate defining a first solid insert receiving void, proximate the first end and a second solid insert receiving void proximate the second end. The device further includes a first solid insert member received within the first solid insert receiving void and a second solid insert member received within the second solid insert receiving void, and a longitudinal optical waveguide grating member held under a tension with the grating member secured to the first solid insert member and to the second solid insert member, wherein the negative thermal expansion substrate reduces the tension, under which the grating member is held, in relationship to a temperature increase of the device.

In another aspect, the invention comprises a method of making an optical waveguide device which includes the steps of providing an optical waveguide grating member, providing a negative thermal expansion supporting member, tensioning the grating member, and securing the grating member to the negative thermal expansion supporting member with a copper alumino silicate glass.

An additional aspect of the invention includes a method of making an optical waveguide device which comprises the steps of providing an optical waveguide grating member, providing a negative thermal expansion substrate, forming a first and a second insert receiving void in the negative thermal expansion substrate, inserting a first solid insert member in to the first insert receiving void and inserting a second solid insert member into the second insert receiving void. The method further includes the steps of tensioning the grating member and securing the grating member to the first solid inserted insert member and to the second solid inserted insert member wherein the negative thermal expansion substrate reduces the tensioning of the grating member in relation to a temperature increase of the device.

An additional aspect of the invention includes an optical waveguide device including an optical waveguide grating member held under tension by bonding the member to a negative thermal expansion substrate with a copper alumino silicate glass.

It is to be understood that both the foregoing general description and the following detailed description are exemplary and explanatory, and are intended to provide further explanation of the invention as claimed.

The accompanying drawings are included to provide a further understanding of the invention and are incorporated in and constitute a part of this specification, illustrate embodiments of the invention and, together with the description, serve to explain the principles of the invention.

DETAILED DESCRIPTION

An optical waveguide device comprising an optical waveguide grating member held under tension with the optical waveguide grating member secured to a supporting member, wherein the inventive device reduces the tension in relation to a temperature increase of the grating member. In an embodiment of the invention the grating member is secured to the supporting member with a securing glass member having a linear coefficient of thermal expansion ranging from $1 \times 10^{-7}/°$ C. to $10 \times 10^{-7}/°$ C. (0° C. to 300° C.).

Reference will now be made in detail to preferred embodiments of the invention, examples of which are illustrated in the accompanying drawings.

Figure 1:
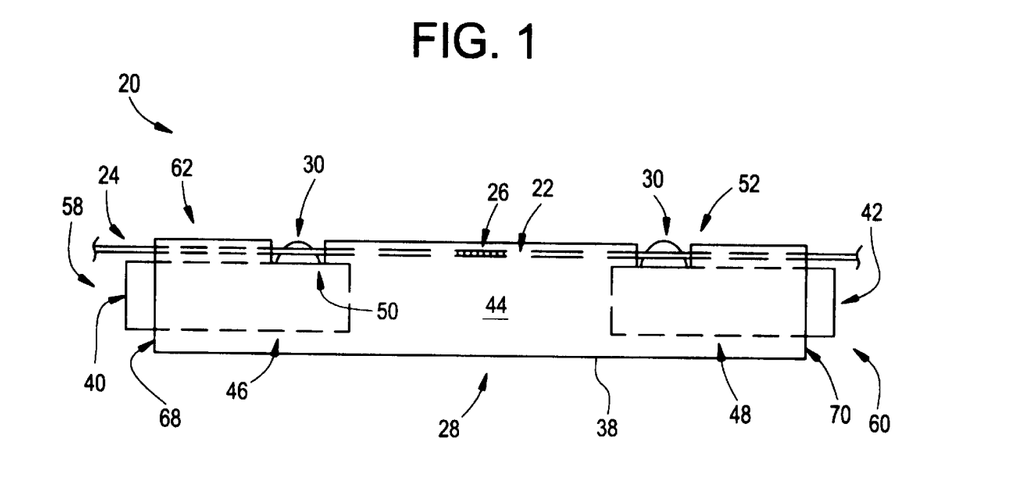
FIG. 1 is a side view of a device in which the present invention is embodied.
Figure 2:
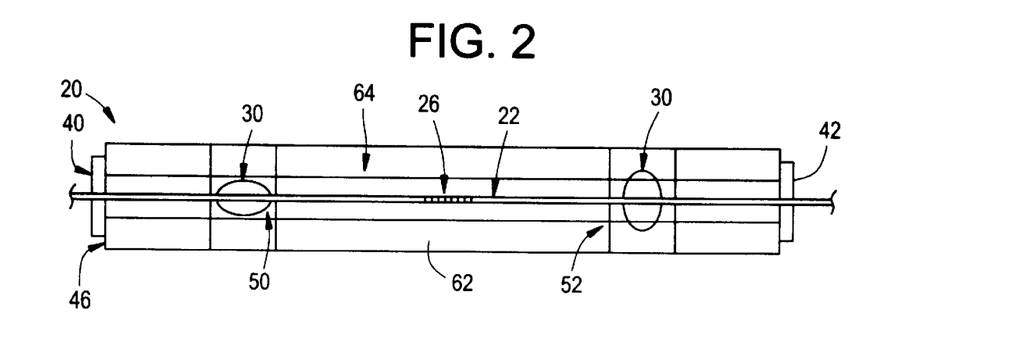
FIG. 2 is a top view of the device shown in FIG. 1.
Figure 3:
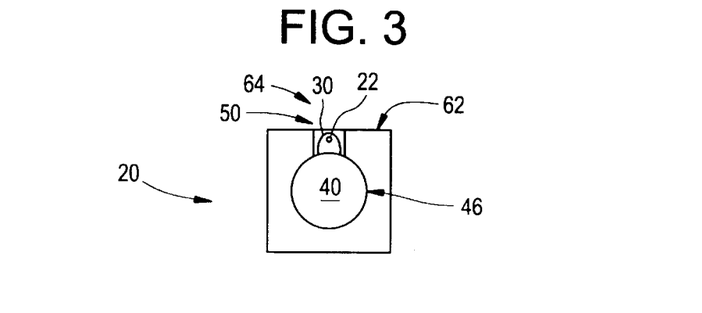
FIG. 3 is an end view of the device shown in FIG. 1.

An exemplary embodiment of the optical waveguide device 20 of the present invention is shown in FIGS. 1–3.

Referring to FIG. 1, optical waveguide device 20, embodied herein, and comprises an optical waveguide grating member 22. Optical waveguide grating member 22 is preferably an optical fiber 24 which includes a grating 26 formed by refractive index changes in the optical fiber. Optical waveguide grating member 22 is most preferably a reflective fiber Bragg grating.

Optical waveguide device 20 further comprises a supporting member 28 and a securing glass member 30, such that optical waveguide grating member 22 is held under a tension of at least 100 psi at the maximum use temperature and secured to supporting member 28 wherein supporting member 28 reduces the tension under which grating member 22 is held in relationship to a temperature increase of device 20. Grating member 22 is secured to supporting member 28 with a securing glass member 30 which has a linear coefficient of thermal expansion ranging from $1 \times 10^{-7}/°$ C. to $10 \times 10^{-7}/°$ C. in the temperature range of 0° C. to 300° C. Preferably first and second securing glass members 30 are comprised of a copper alumino silicate glass having such a linear thermal expansion. Preferably the copper alumino silicate glass consists essentially of $Cu_2O$, $Al_2O_3$, and $SiO_2$. Preferably securing glass 30 has a linear coefficient of thermal expansion ranging from $2 \times 10^{-7}/°$ C. to $9 \times 10^{-7}/°$ C. (0° C. to 300° C.), and more preferably ranging from $3 \times 10^{-7}/°$ C. to $8 \times 10^{-7}/°$ C. (0° C. to 300° C). An even further preferred range is $4 \times 10^{-7}/°$ C. to $8 \times 10^{-7}/°$ C., and more preferably $5 \times 10^{-7}/°$ C. to $7 \times 10^{-7}/°$ C., (0° C. to 300° C.). Preferably securing glass 30 is vitreous. The securing glass is chosen so that the securing glass expansion characteristics closely match those of the optical waveguide device at temperatures lower than the set point in order to minimize thermal stress build up. Most preferably, such stresses should be less than 3 kpsi.

A preferred copper alumino silicate glass for use in the invention is disclosed in concurrently filed U.S. Provisional Patent Application No. 60/107,379, titled *Fusion Sealed Article and Method*, by D. M. Young, which is hereby incorporated by reference.

Figure 4:
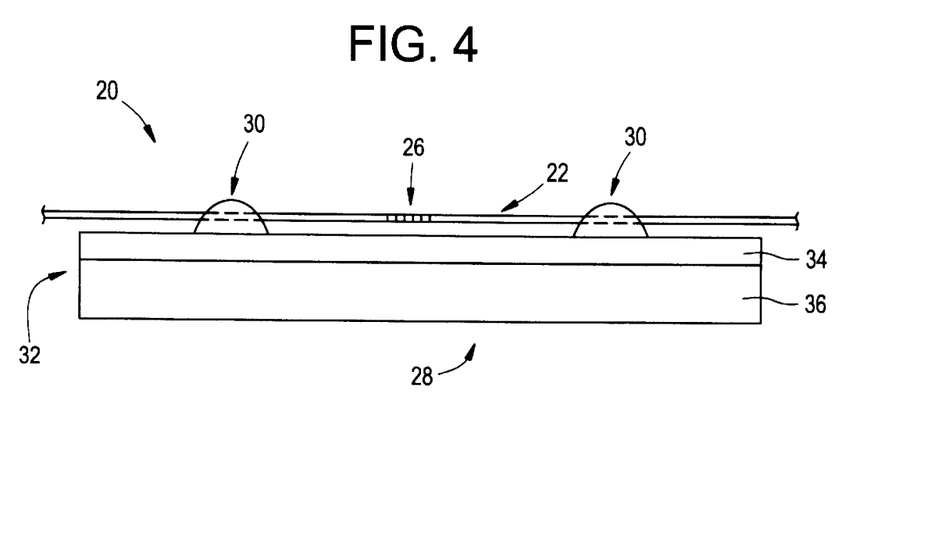
FIG. 4 is a side view of a device in which the present invention is embodied.

Supporting member 28 has an actual or effective negative coefficient of thermal expansion to provide for the reduction of tension during a temperature increase and an increase of the tension during a temperature decrease. Supporting member 28 can have an effective negative coefficient of thermal expansion when it is comprised of two or more materials having a positive thermal expansion which are arranged and connected together so that the difference in positive thermal expansion provides an effective negative thermal expansion such as shown in FIG. 4. Supporting member 28 in FIG. 4 is a negative expansion bimetallic strip 32 comprised of an Invar metallic strip 34 attached on top of a stainless steel strip 36 which provides an effective negative thermal expansion.

Preferably supporting member 28 is comprised of a material that has a negative coefficient of thermal expansion. Zirconium tungstate ceramic bodies are an example of such a material. Another material having a thermal expansion coefficient of $-30$ to $-90 \times 10^{-7}/°$ C. is a microcracked beta-eucryptite glass-ceramic of a $Li_2O$, $Al_2O_3$, and $SiO_2$ composition. Preferably, supporting member 28 is comprised of a negative thermal expansion material body 38, most preferably negative thermal expansion material body 38 is a microcracked beta-eucryptite glass-ceramic having a thermal expansion coefficient in the ranges of $-60$ to $-85 \times 10^{-7}/°$ C., and most preferably $-65$ to $-80 \times 10^{-7}/°$ C.

In reference to FIGS. 1–3, support member 28 is comprised of a first solid insert member 40 and a second solid insert member 42, and a central negative thermal expansion member 44 which defines a first insert receiving void 46 and a second insert receiving void 48. First solid insert member 40 is received in and contained within first insert receiving void 46 and second solid insert member 42 is received in and contained within second insert receiving void. Preferably first and second solid insert members 40 and 42 are solids with a linear coefficient of thermal expansion ranging from $1 \times 10^{-7}/°$ C. to $10 \times 10^{-7}/°$ C. (0° C. to 300° C.). Preferably 40 and 42 are comprised of a glass or glass ceramic. Insert members 40 and 42 may be comprised of copper alumino silicate glass, or a silica-containing glass, such as fused silica.

Preferably grating member 22 is secured to first and second solid insert members 40 and 42 with securing glass 30. First and second insert members 40 and 42 are substantially contained within the central negative thermal expansion member 44 and first insert receiving void 46 includes a securing glass aperture 50 for receiving securing glass 30 and second insert receiving void 48 includes a securing glass aperture 52 for receiving securing glass 30. Preferably grating member 20 is secured to first and second insert members 40 and 42 with securing glass 30 which does not make contact with central negative thermal expansion member 44.

Figure 5:
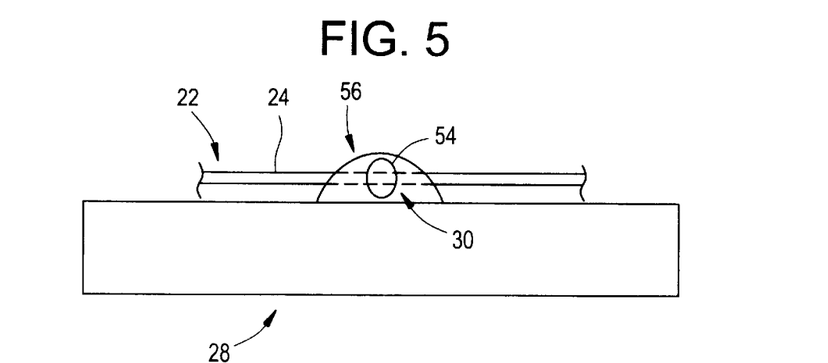
FIG. 5 is a side view of a device in which the present invention is embodied.

In reference to FIG. 5, securing glass member 30 can comprise a securing anchor member 54 formed on grating member 22 which is constrained within an adhesive body 56, with adhesive body 56 secured and adhered to supporting member 28. Adhesive body 56 can be formed from an adhesive substance such as solder or epoxy, and is preferably a fusion seal formed from a low melting glass frit having a negative CTE mill addition. Securing anchor member 54 is formed on grating member 22 by melting the Cu$_2$O—Al$_2$O$_3$—SiO$_2$ glass member 30 around optical fiber 24 and allowing glass 30 to cool into a solid anchor shape that is readily constrainable within a later formed adhesive body 56. Intermediate securing anchor member 54 provides a means for utilizing securing glass 30 to secure grating member 22 to supporting member 28 without securing glass 30 directly contacting supporting member 28.

The invention further includes an athermalized optical waveguide device 20 comprised of an optical waveguide grating member 22 with a reflective Bragg grating 26 and a negative thermal expansion supporting member 28, with the optical waveguide grating member 22 secured to supporting member 28 with a copper alumino silicate glass 30. Preferably the copper alumino silicate glass consists essentially of Cu$_2$O, Al$_2$O$_3$, and SiO$_2$. Preferably a maximum stress formed between grating member 22 and copper alumino silicate glass 30 is less than 3 Kpsi. Preferably the copper alumino silicate glass batch composition consists essentially of 48–67% wt.SiO$_2$, 10–19% wt.Al$_2$O$_3$, 20–38% wt.CuO, and most preferred 50–65% wt.SiO$_2$, 12–16% wt.Al$_2$O$_3$, 24–34% wt.CuO. Similarly, it is preferred to minimize expansion mismatch between supporting member 28 and adhesive body 56.

As shown in FIGS. 1–3, 6–7, 9–12, the invention includes an optical waveguide device 20 comprised of a negative thermal expansion longitudinal body substrate 38 having a first end 58 and a second distal end 60, with substrate 38 defining a first solid insert receiving void 46 proximate first end 58 and a second solid insert receiving void 48 proximate second end 60. First solid insert member 40 is received within first solid insert receiving void 46 and second solid insert member 42 is received within second solid insert receiving void. Solid insert members are comprised of a low expansion material, preferably the solid insert material has an expansion of $1\times10^{-7}$ to $10$–$10^{-7}/°$ C. (0° to 300° C.). Longitudinal optical waveguide grating member 22 is held under a tension and is secured to first solid insert member 40 and second solid insert member 42 wherein negative thermal expansion substrate 38 reduces the tension of grating member 22 in relationship to a temperature increase of optical waveguide device 20.

In one embodiment, as shown in FIGS. 1–3, first and second solid inserts 40 and 42 are comprised of a silica glass such as fused silica, or copper alumino silicate glass. First and second solid inserts 40 and 42 are in the form of a solid cylinder which is sized so that it can be inserted into the solid insert receiving void and contained therein. Preferably grating member 22 is secured to first and second solid insert members 40 and 42 with a securing glass having a linear coefficient of thermal expansion ranging from $1\times10^{-7}/°$ C. to $10\times10^{-7}/°$ C. (0° C. to 300° C.), which is preferably comprised of a copper alumino silicate glass.

Longitudinal body substrate 38 comprises a first top surface 62 which defines a first longitudinal channel 64 wherein longitudinal optical waveguide grating member 22 is in alignment with first longitudinal channel 64, and is preferably received within channel 64.

In reference to FIGS. 1–3, first end 58 comprises a first end surface 68 and second end 60 comprises a second end surface 70. First end surface 68 defines first solid insert receiving void 46 with first solid insert receiving void 46 comprising a substantially cylindrical void having an inside diameter D. First solid insert member 40 comprises a solid cylinder having an outside diameter substantially equal to D such that the first solid cylinder insert member is received within the substantially cylindrical solid insert receiving void.

Figure 6:
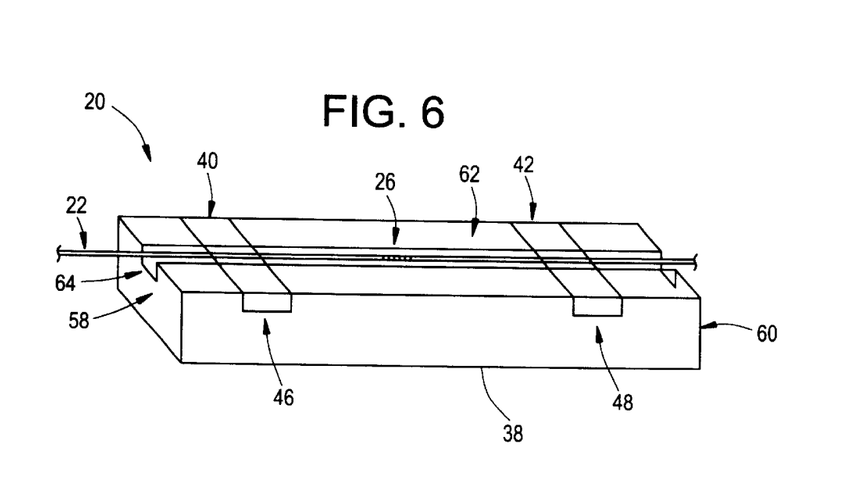
FIG. 6 is a perspective view of a device in which the present invention is embodied.

In reference to FIG. 6, first top surface 62 further defines first solid insert receiving void 46 wherein first solid insert receiving void 46 comprises a first solid insert receiving channel inboard of first end 58 and substantially perpendicular to first longitudinal channel 64. First top surface 62 defines said second solid insert receiving void 48 which is comprised of a second solid insert receiving channel inboard of second end 60 and is substantially perpendicular to first longitudinal channel 64. First and second solid insert members 46 and 48 are preferably comprised of a glass, ceramic or glass-ceramic having a coefficient of thermal expansion ranging from 0 to $10\times10^{-7}/°$ C. (0° C. to 300° C.), most preferably a silica glass doped with titanium, such as ULE® brand glass which is commercially available from Corning Incorporated, Corning, N.Y. An alternative, and preferred glass-ceramic, is a Beta-Quartz solid solution aluminosilicate glass-ceramic, such as a Li$_2$O—Al$_2$O$_{3-SiO2}$ glass-ceramic containing ZrTiO$_4$, an example of which has been commercially available from Corning Incorporated, Corning, N.Y. as Visions™ brand cookware. Preferably first and second solid insert members 40 and 42, and first and second insert receiving voids 46 and 48 have a tapered trapezoidal cross section, and the insert member can be slid into the receiving void from the side.

Figure 7:
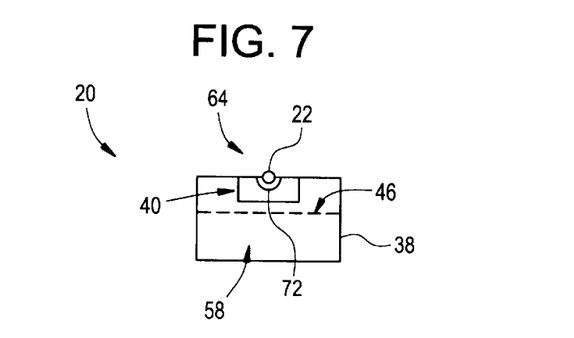
FIG. 7 is an end view of the device shown in FIG. 6.

As shown in FIG. 7, first and second solid insert members 40 and 42 can include a groove 72, wherein waveguide grating member 22 is secured to solid insert member 40 and is received in groove 72. Preferably both first and second solid insert members 40 and 42 include a groove 72 which is in alignment with longitudinal channel 64. Preferably groove 72 is sized in relationship to the diameter of grating member 22 so that grating member 22 is secured to solid insert member 40 with a thin film adhesive, which can be comprised of a cement, frit seal, epoxy or securing glass 30.

Figure 9:
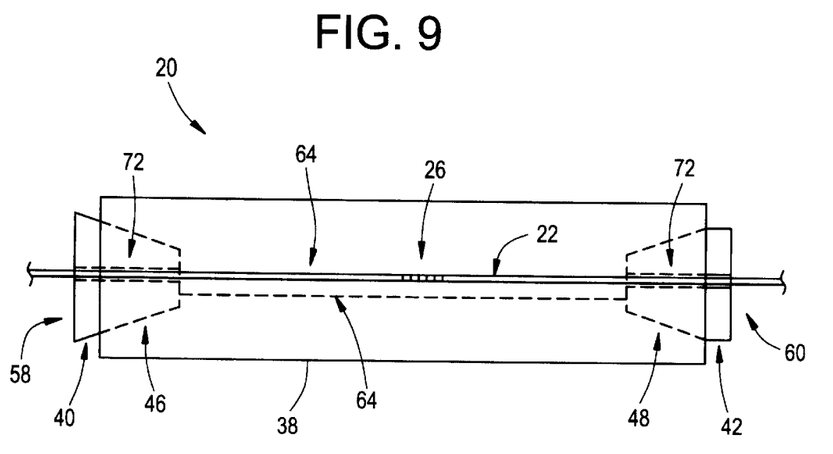
FIG. 9 is a side view of a device in which the present invention is embodied.
Figure 10:
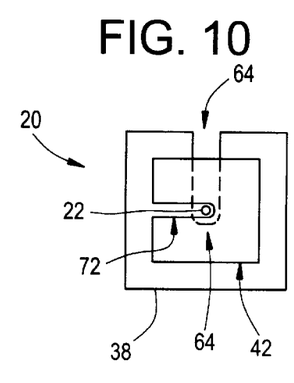
FIG. 10 is an end view of the device shown in FIG. 9.
Figure 11:
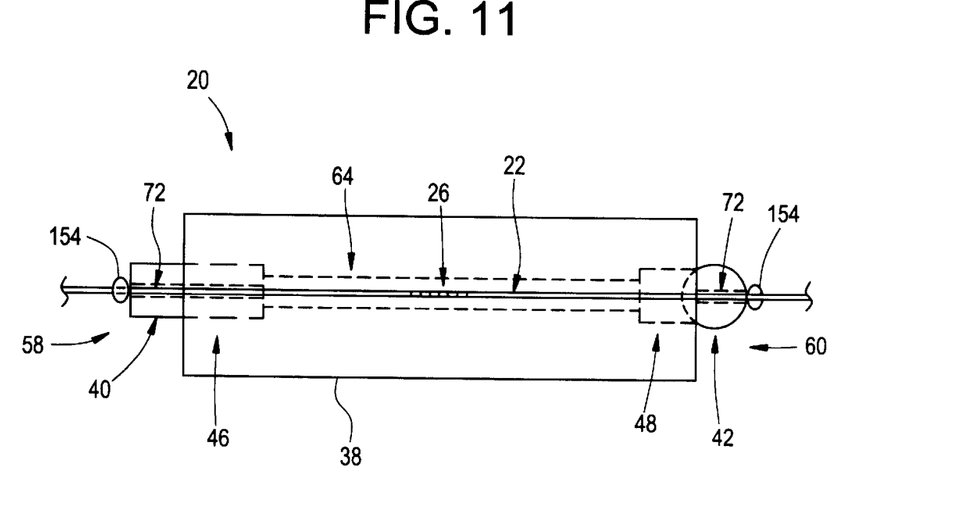
FIG. 11 is a side view of a device in which the present invention is embodied.
Figure 12:
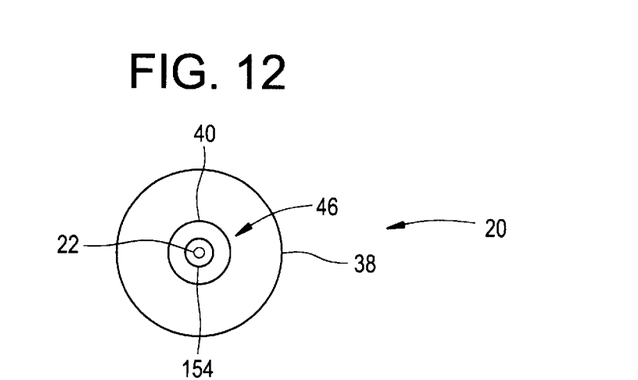
FIG. 12 is an end view of the device shown in FIG. 11.
Figure 13:
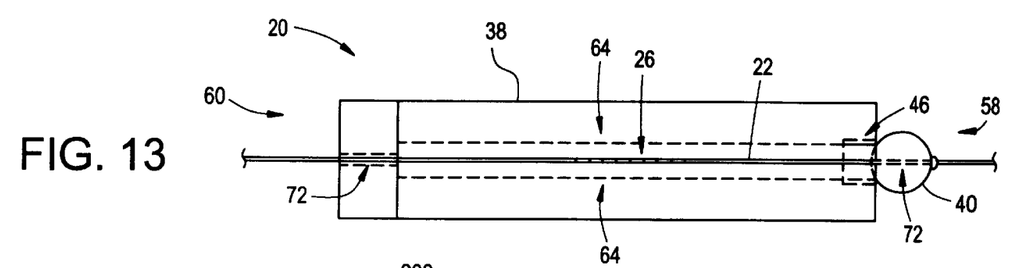
FIG. 13 is a side view of a device in which the present invention is embodied.
Figure 14:
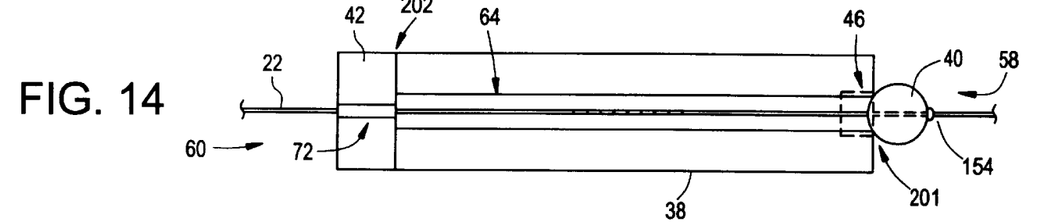
FIG. 14 is a top view of the device shown in FIG. 13.
Figure 15:
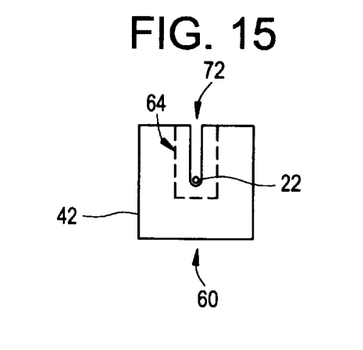
FIG. 15 is an end view of the device shown in FIG. 13.
Figure 16:
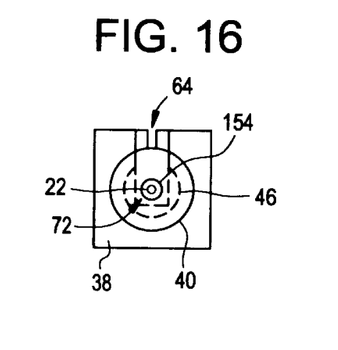
FIG. 16 is an end view of the device shown in FIG. 13.

In reference to FIGS. 9–12, first and second solid insert members 40 and 42 are preferably comprised of a glass, ceramic or glass-ceramic as described in regard to the solid insert members of FIGS. 6–7. In FIGS. 9–16, longitudinal channel 64 is comprised of a centered channel through negative thermal expansion longitudinal body substrate 38 such that substrate 38 is utilized in a tubular configuration. In FIGS. 9–10, 13–16 longitudinal centered channel 64 can be provided by slot cutting. In FIGS. 11–12, longitudinal centered channel 64 can be provided by boring a hole through substrate 38. The slotted centered channel 64 is beneficial in that fiber threading is not required. Similarly in FIGS. 9–16, fiber receiving groove 72 is comprised of a centered channel through the solid insert member.

In FIGS. 9–10, solid insert receiving voids 46 and 48 have a polygon cross section for receiving solid keystone insert members 40 and 42. Preferably the shape of solid keystone insert members 40 and 42 is comprised of a pyramid. The polygon base and geometry of a pyramid shape provides for a beneficial keystone alignment and securement. In FIGS. 9–10, optical waveguide grating member 22 is adhered to the solid keystone insert members along the length of the centered channel grooves 72 with a thin film adhesive as utilized in reference to FIG. 7. Preferably the adhesive is a wicking adhesive which flows/wicks along the fiber and the centered channel. In FIGS. 9–10, centered channel 72 of insert member 42 is a slotted center channel and centered channel 72 of insert member 40 is a bored centered channel.

In FIGS. 11–12, solid insert member 40 is a solid cylinder with a centered channel and solid insert member 42 is a solid sphere with a centered channel. As described with FIGS. 9–10, in FIGS. 11–12 grating member 22 can be adhered to the solid insert members, but it is preferred to use a solid securing anchor member 154 with at least one of the solid insert members for securement. As shown in FIGS. 11–12, first solid insert member 40 includes a centered channel groove 72 and a first solid securing anchor member 154 adhered to optical waveguide grating member 22 such that the solid securing anchor member 154 abuts insert member 40 and is larger than the diameter of centered channel 72 so that grating member 22 which is under tension is physically secured to first solid insert member 40. Similarly, second solid insert member 42 is secured to grating member 22 using solid securing anchor member 154. Solid securing anchor member 154 can be comprised of a bead having a center bore with the bead adhered to grating member 22. Solid securing anchor member 154 can also be comprised of a solidified adherent. Such a solidified adherent can be formed on grating member 22 using a solidifying adherent similar to the forming of securing anchor member 54 in FIG. 5. Solid securing anchor members 154 are physically secured to the solid insert members since grating member 22 is under tension. Such physical securement of grating member 22 to a solid insert member allows strength/reliability proof testing of the assembled device in that additional tension can be applied to grating member 22. In a preferred embodiment grating member 22 can be adhered to one of the solid insert members and physically secured with a solid securing anchor member 154 at the other solid insert member. Such use of a solid securing anchor member 154 allows for pulling on grating member 22 so that member 154 moves away from its solid insert member. This provides a non-destructive method of testing the strength/reliability of a fully assembled device 20 by applying additional tension to grating member 22 (tension which exceeds that experienced in the normal intended use of the device).

The invention further includes an optical waveguide device comprised of a unitary negative thermal expansion longitudinal body substrate with a first end, a second distal end, and a centered channel, a first solid member with a centered channel, a second solid member with a centered channel, said first solid member adjacent said first end, said second solid member adjacent said second end, wherein a longitudinal optical waveguide grating member is received in said substrate centered channel, said first solid member centered channel, and said second solid member centered channel and held under a tension and secured to the first solid member and the second solid member so that the negative thermal expansion substrate reduces said tension in relationship to a temperature increase of the device. As shown in the device of FIGS. 13–16, substrate 38 includes a first end 58, a second end 60, and a centered channel 64. First solid member 40 is adjacent to and abutts first end 58 of substrate 38. Second solid member 42 is adjacent to and abutts second end 60. Spherical first solid member 40 includes a fiber receiving centered channel 72. Flat faced second solid member 42 includes a fiber receiving centered channel 72. Longitudinal optical waveguide fiber Bragg grating member 22 is received in centered channel 64 and the centered channels 72 of solid members 40 and 42. Grating member 22 is held under a tension and secured to solid members 40 and 42. Grating member 22 is physically secured to first solid member 40 with solid securing anchor member 154. Grating member 22 is adhered to second solid member 42 inside centered channel 72 with an adhesive such as copper alumino silicate glass and preferably a thin film adhesive. Solid members 40 and 42 are in compression against the ends of substrate 38 and the device 20 can be proof tested on second end 60 in addition to first end 58 prior to final assembly/securement. After proof testing an adhesive is applied to interface 202 between solid member 42 and substrate 38, and to interface 201 between solid member 40 and substrate 38. An adhesive, for example epoxy, at interfaces .201 and 202 protects the device and adheres solid members 40 and 42 to substrate 38. The invention includes the method of making an optical waveguide device 20 by providing an optical grating member 22, providing a longitudinal negative thermal expansion substrate 38 having a first end 58 and a second end 60, forming a centered channel 64 in substrate 38, abutting first solid member 40 adjacent to first end 58, abutting second solid member 42 adjacent to second end 60, with first solid member 40 having a centered channel 72 and second solid member 42 having a centered channel 72, tensioning grating member 22, physically securing grating member 22 to first solid member 40, adhering grating member 22 to second solid member 42.

The invention further includes the method of making optical waveguide devices 20. The invention comprises a method of making an optical waveguide device 20, which includes the steps of providing an optical waveguide grating member 22, providing a negative thermal expansion supporting member 28, tensioning the grating member 22, and securing the grating member 22 to the negative thermal expansion supporting member 28 with a copper alumino silicate glass. The method of securing the grating member to the supporting member can include forming an intermediate anchoring member with the copper alumino silicate glass which is then contained in an adhesive body which is secured to the supporting member. The method of securing the grating member to the supporting member can include physically securing with a solid securing anchor member.

Figure 8:
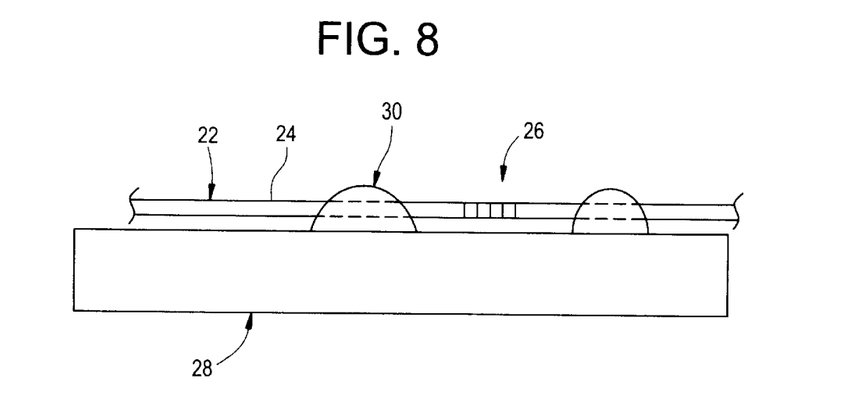
FIG. 8 is a side view of a device in which the present invention is embodied.

Additionally, the invention includes an optical waveguide device comprising an optical waveguide grating member held under a tension, said optical waveguide grating member bonded with a copper alumino silicate glass to a negative thermal expansion substrate. $Cu_2O$—$Al_2O_3$—$SiO_2$ securing glass members can be directly attached to a negative thermal expansion beta-eucryptite supporting member. Such a direct bonding of the securing glass member to the negative thermal expansion supporting member can be used instead of bonding the securing glass member to an intermediate insert member. The high strength characteristics of the copper alumino silicate glass are particularly beneficial for directly bonding an optical waveguide fiber grating to a negative thermal expansion substrate such as a beta-encryptite glass-ceramic. As illustrated in FIG. 8, optical fiber 24 is directly bonded with copper alumino silicate glass 30 to a beta-eucryptite glass-ceramic negative thermal expansion substrate 28.

The invention further comprises a method of making an optical waveguide device 20, which includes the steps of providing an optical waveguide grating member 22, providing a negative thermal expansion substrate 38, forming a first and a second insert receiving void in the negative thermal expansion substrate. The method further includes inserting a first solid insert member into the first insert receiving void and inserting a second solid insert member into the second insert receiving void, tensioning the optical waveguide grating member, and securing the optical waveguide grating member to the first solid inserted insert member and the second solid inserted insert member, wherein the negative thermal expansion substrate reduces the tensioning of the optical waveguide grating member in relationship to a temperature increase of the optical waveguide device. Forming a first insert receiving void preferably comprises drilling a first hole in a first end of the substrate and forming a second insert receiving void comprises drilling a second hole in a second end of the substrate and inserting a first solid insert member comprises inserting a silica cylinder into the first hole. Securing the optical waveguide grating member to the first solid inserted insert member further comprises securing the grating member to the first solid inserted insert member with a copper alumino silicate glass. Securing the grating member to the solid inserted insert member also includes physically securing the grating member to the insert member with a solid securing anchor member.

Securing glass 30 was provided by melting vitreous $Cu_2O$—$Al_2O_3$—$SiO_2$ sealing glass while in contact with optical fiber 24 and then allowing the melted glass to cool to form securing glass member 30. Copper alumino silicate securing glass 30 was used to attach an optical fiber to a fused silica substrate. The copper alumino silicate securing glass precursors were provided in the form of a frit paste which was melted using a heat source such as $CO_2$ laser or a focused high intensity light bulb. One embodiment of the copper alumino silicate securing glass used was obtained from the SEM-COM Company of Toledo, Ohio under the glass code SCY-2 (Copper Glass RZ-2) with a thermal coefficient of expansion of about $4.8 \times 10^{-7}/°C$.

More preferred copper alumino silicate glasses were produced in the compositional batch ranges of 48–67% wt.$SiO_2$, 10–19% wt.$Al_2O_3$, 20–38% wt.CuO, 0–4% wt.$B_2O_3$, and most preferred batch ranges of 50–65% wt.$SiO_2$, 12–16% wt.$Al_2O_3$, 24–34% wt.CuO, and had thermal coefficients of expansion in the range of about 6.8 to $8.7 \times 10^{-7}/°C$ as disclosed in the following Tables 1 and 2. Batch compositions such as 51.4% wt.$SiO_2$, 14.5% wt.$AL_2O_3$, 34% wt.CuO (Glass Sample #A7) and of 60% wt.$SiO_2$, 12% wt.$Al_2O_3$, 28% wt.CuO (Glass Sample #B3) were particularly beneficial.

TABLE 1

| | Glass Sample # | | | | | | | | |
|---|---|---|---|---|---|---|---|---|---|
| | A1 | A2 | A3 | A4 | A5 | A6 | A7 | A8 | A9 |
| Oxide Compositions | | | | | | | | | |
| $SiO_2$ | 61.8 | 62.5 | 57.9 | 58.5 | 54.5 | 55.0 | 51.4 | 51.9 | 56.1 |
| $Al_2O_3$ | 17.5 | 14.1 | 16.4 | 13.2 | 15.4 | 12.5 | 14.5 | 11.7 | 15.9 |
| MgO | 20.7 | 21.0 | 12.9 | 13.1 | 6.1 | 6.1 | 0 | 0 | 9.4 |
| CuO | 0 | 0 | 12.8 | 12.9 | 24.0 | 24.3 | 34.0 | 34.4 | 18.6 |
| $B_2O_3$ | 0 | 2.4 | 0 | 2.3 | 0 | 2.1 | 0 | 2.0 | 0 |
| | 40.2 | 41.2 | 30.4 | 31.2 | 20.6 | 20.0 | 6.8 | 10.1 | 25.0 |

Thermal Expansion ($\times 10^{-7}/°C$.)

Table 1 sample compositions were Ball Mill batch mixed and melted at 1550° C. for 6 hours in a Pt crucible and then made into square slabs which-were annealed at 750° C.

TABLE 2

| | Glass Sample # | | | | | | | | |
|---|---|---|---|---|---|---|---|---|---|
| | B1 | B2 | B3 | B4 | B5 | B6 | B7 | B8 | B9 |
| Oxide Compositions | | | | | | | | | |
| CuO | 24 | 26 | 28 | 24 | 26 | 28 | 24 | 26 | 28 |
| $Al_2O_3$ | 12 | 12 | 12 | 14 | 14 | 14 | 16 | 16 | 16 |

TABLE 2-continued

| | Glass Sample # | | | | | | | | |
|---|---|---|---|---|---|---|---|---|---|
| | B1 | B2 | B3 | B4 | B5 | B6 | B7 | B8 | B9 |
| $SiO_2$ | 64 | 62 | 60 | 62 | 60 | 58 | 60 | 58 | 56 |
| | 8.2 | 6.7 | 6.8 | 7.7 | 7.6 | 8.2 | 8.7 | 7.4 | 7.7 |

Thermal Expansion ($\times 10^{-7}/°C$.)

Table 2 sample compositions were Ball Mill batch mixed and melted at 1550° C. for 6 hours in a Pt crucible and then made into patties which were not annealed.

As shown by Table 1, the presence of MgO in the batch increased the thermal expansion characteristics of the glass. Glass sample A7 shows the benefits in terms of thermal expansion characteristics of the ternary glasses formed from $SiO_2$, $Al_2O_3$, and CuO. Glass sample A8 demonstrates that a small level addition of $B_2O_3$ (about 2% wt.) results in only a modest increase in thermal expansion characteristics. The addition of a low level of $B_2O_3$ (0 –3% wt.) can provide the resulting glass with beneficial process characteristics such as lower sealing temperature without a drastic rise in thermal expansion. The resultant glass compositions with beneficial thermal expansion characteristics of Tables 1 and 2 are formable into a glass frit using glass frit processing steps, equipment and supplies.

A securing glass was formed by melting a $Cu_2O$—$Al_2O_3$—$SiO_2$ glass frit. The securing glass was used to attach an optical fiber under tension to a fused silica substrate. The securing glass was viewed under a 63×magnification and there were no observed cracks in the silica substrate, optical fiber, or the securing glass member. Stresses between the optical fiber and the securing glass were calculated to be less than 3 Kpsi.

The copper alumino silicate securing glass was used to secure an optical fiber under tension to a negative expansion substrate formed from a beta-eucryptite glass-ceramic. The ends of a beta-eucryptite glass-ceramic substrate were core drilled and silica cane segments were inserted into the core drilled holes to allow bonding of the optical fiber to the silica cane segments. The copper alumino silicate securing glass secured the optical fiber, which was under appropriate tension, to the silica cane segments and the negative expansion beta-enryptic material controlled the temperature variant optical characteristics of the Bragg grating in the optical fiber. The silica cane pieces were mechanically interlocked into the substrate holes, in that the dimensions were correspondingly close and the fiber was under tension and inhibited the removal of the silica cane.

It will be apparent to those skilled in the art that various modifications and variations can be made in the optical waveguide device and method of making the present invention without departing from the spirit or scope of the invention. Thus, it is intended that the present invention cover the modifications and variations of this invention provided they come within the scope of the appended claims and their equivalents.

We claim:

1. An optical waveguide device comprising of all optical waveguide grating member held under a tension, said optical waveguide grating member secured to a supporting member wherein said supporting member reduces said tension in relationship to a temperature increase of said optical waveguide grating member and said supporting member, said optical waveguide grating member secured to said supporting member with a securing glass member having a linear coefficient of thermal expansion ranging from about $1 \times 10^{-7}/°C$ to $10 \times 10^{-7}/°C$ (0° C. to 300° C.), where said securing glass comprises a copper alumino silicate glass.

2. An optical waveguide device as claimed in claim 1, wherein said securing glass consists essentially of $Cu_2O$, $Al_2O_3$, and $SiO_2$.

3. An optical waveguide device as claimed in claim 1, wherein said securing glass comprises 48–67% wt.$SiO_2$, 10–19% wt. $Al_2O_3$, 20–38% wt.CuO and 0–4% wt.$B_2O_3$.

4. An optical waveguide device as claimed in claim 1, wherein said securing glass has a linear coefficient of thermal expansion ranging from $2 \times 10^{-7}/°C$ to $9 \times 10^{-7}/°C$ (0° to 300° C.).

5. An optical waveguide device as claimed in claim 1, wherein said securing glass has a linear coefficient of thermal expansion ranging from $3 \times 10^{-7}/°C$ to $8 \times 10^{-7}/°C$ (0° to 300° C.).

6. An optical waveguide device as claimed in claim 1, wherein said securing glass is vitreous.

7. An optical waveguide device as claimed in claim 1, wherein a stress between said optical waveguide grating member and said securing glass is less than 3 Kpsi.

8. An optical waveguide device as claimed in claim 1, wherein a stress between said optical waveguide grating member and said securing glass is less than 1 Kpsi.

9. An optical waveguide device as claimed in claim 1, wherein said supporting member has a negative coefficient of thermal expansion.

10. An optical waveguide device comprising of an optical waveguide grating member held under a tension said optical waveguide grating member secured to a supporting member wherein said supporting member reduces said tension in relationship to a temperature increase of said optical waveguide grating member and said supporting member, said optical waveguide grating member secured to said supporting member with a securing glass member having a linear coefficient of thermal expansion ranging from about $1 \times 10^{-7}/°C$ to $10 \times 10^{-7}/°C$ (0° C. to 300° C.), wherein said supporting member comprises a first insert member and a second insert member, and a central negative thermal expansion member which defines a first insert receiving void and a second insert receiving void, wherein said first insert member is received in and contained within said first insert receiving void and said second insert member is received in and contained within said second insert receiving void.

11. An optical waveguide device as claimed in claim 10, wherein said first and second insert members have a linear coefficient of thermal expansion ranging from $1 \times 10^{-7}/°C$ to $10 \times 10^{-7}/°C$ (0° C. to 300° C.).

12. An optical waveguide device as claimed in claim 10 wherein said optical waveguide grating member is secured to said first and second insert members with said securing glass.

13. An optical waveguide device as claimed in claim 11 wherein said first and second insert members are comprised of copper alumino silicate.

14. An optical waveguide device as claimed in claim 11 wherein said first and second insert members are comprised of silica.

15. An optical waveguide device as claimed in claim wherein said first and second insert members are substantially contained within said central negative thermal expansion member and said first insert receiving void includes an aperture for receiving said securing glass and said second insert receiving void includes an aperture for receiving said securing glass so that said optical waveguide grating member is secured to said first and second insert member with said securing glass and said securing glass does not contact said central negative thermal expansion member.

16. An optical waveguide device as claimed in claim 1, wherein said securing glass comprises an intermediate securing anchor member which is constrained within an adhesive body, said adhesive body secured and adhered to said supporting member.

17. An athermalized optical waveguide device comprising an optical waveguide grating member and a negative expansion support member, said optical waveguide grating member secured to said support member with a copper alumino silicate glass.

18. An optical waveguide device as claimed in claim 17 wherein said copper alumino silicate glass consists essentially of $Cu_2O$, $Al_2O_3$, and $SiO_2$.

19. An optical waveguide device as claimed in claim 17, wherein a stress between said optical waveguide grating members and said copper alumino silicate glass is less than 3 Kpsi.

20. An optical waveguide device comprising a unitary negative thermal expansion longitudinal body substrate having a first end and a second distal end, said substrate defining a first solid insert receiving void proximate said first end and a second solid insert receiving void proximate said second end, a first solid insert member, said first solid insert member received within said first solid insert receiving void, a second solid insert member, said second solid insert member received within said second solid insert receiving void, a longitudinal optical waveguide grating member held under a tension, said optical waveguide grating member secured to said first solid insert member and said second solid insert member, wherein said negative thermal expansion substrate reduces said tension in relationship to a temperature increase of said optical waveguide device, wherein said first solid insert member is comprised of at least one of a solid sphere and a solid keystone.

21. An optic waveguide device as claimed in claim 20, wherein said first solid insert member is comprised of silica.

22. An optical waveguide device as claimed in claim 20, wherein said first solid insert member is comprised of a copper alumino silicate glass.

23. An optical waveguide device as claimed in claim 20, wherein said first solid insert member is comprised of a solid cylinder.

24. An optical waveguide device as claimed in claim 20, wherein said optical waveguide grating member is secured to said first solid member with a securing glass having a linear coefficient of thermal expansion ranging from $1 \times 10^{-7}/°C$ to $10 \times 10^{-7}/°C$ (0° C. to 300° C.).

25. An optical waveguide device as claimed in claim 24, wherein said securing glass comprises a copper alumino silicate glass.

26. An optical waveguide device as claimed in claim 20, wherein said longitudinal body substrate defines a first longitudinal channel, wherein said longitudinal optical waveguide grating member is in alignment with said first longitudinal channel.

27. An optical waveguide device as claimed in 26, wherein said first end comprises a first end surface and said second end comprises a second end surface, said first end surface defining said first solid insert receiving void, said first solid insert receiving void comprising a substantially cylindrical void having an inside diameter D, said first solid insert member comprising a solid cylinder having an outside diameter substantially equal to D such that said first solid cylinder insert member is received within said substantially cylindrical solid insert receiving void.

28. An optical waveguide device as claimed in claim 20, wherein said first solid insert member is comprised of titanium doped silica.

29. An optical waveguide device as claimed in claim 20, wherein said first solid insert member is comprised of a glass, ceramic, or glass-ceramic having a coefficient of thermal expansion ranging from $1\times10^{-7}/°$ C. to $10\times10^{-7}/°$ C. (0° C. to 300° C.).

30. An optical waveguide device as claimed in claim 20, wherein said first solid insert member is comprised of aluminosilicate glass-ceramic.

31. An optical waveguide device as claimed in 26, said first top surface defining said first solid insert receiving void, wherein said first solid insert receiving void comprises a first solid insert receiving channel inboard of said first end and substantially perpendicular to said first longitudinal channel, and said first top surface defines said second solid insert receiving void, wherein said second solid insert receiving void comprises a second solid insert receiving channel inboard of said second end and substantially perpendicular to said first longitudinal channel.

32. An optical waveguide device as claimed in 31, wherein said first solid insert receiving channel has a trapezoidal cross section.

33. An optical waveguide device as claimed in 31, said first solid insert member further comprising a groove, wherein said optical waveguide grating member secured to said first solid insert member is received in said groove.

34. An optical waveguide device as claimed in claim 20, wherein said solid insert member is comprised of a centered channel, wherein said optical waveguide grating member is received in said solid insert member centered channel.

35. An optical waveguide device as claimed in claim 20, wherein said solid keystone insert member is comprised of a pyramid.

36. An optical waveguide device as claimed in claim 20, wherein said first solid insert receiving void has a polygon cross-section.

37. An optical waveguide device as claimed in claim 20, wherein said longitudinal body substrate comprises a centered channel.

38. An optical waveguide device as claimed in claim 37, said first solid insert member comprised of a centered channel, said first solid insert member centered channel having a diameter, a first solid securing anchor member, said first solid securing anchor member adhered to said optical waveguide grating member, said first solid securing anchor member abuts said first solid insert member and said first solid securing anchor member is larger than said first solid insert member centered channel diameter, wherein said optical waveguide grating member is physically secured to said first solid insert member.

39. A method of making an optical waveguide device, said method comprising providing an optical waveguide grating member; providing a negative thermal expansion supporting member; tensioning said optical waveguide grating member; securing said optical waveguide grating member to said negative thermal expansive supporting member with a copper alumino silicate glass.

40. A method as claimed in claim 39 wherein securing comprises forming an intermediate anchoring member with said copper alumino silicate glass.

41. A method of making an optical waveguide device, said method comprising providing an optical waveguide grating member; providing a longitudinal negative thermal expansion substrate having a first end and a second distal end; forming a first solid insert receiving void proximate said first end and forming a second solid insert receiving void proximate said second end, inserting a first solid member adjacent to said first end and inserting a second solid member adjacent to said second end, said first solid member having a centered channel, said second solid member having a centered channel; tensioning said optical waveguide grating member; physically securing said optical waveguide grating member to said first solid member; adhering said grating member to said second solid member, wherein said negative thermal expansion substrate reduces the tensioning of said optical waveguide grating member in relationship to a temperature increase of said optical waveguide device, wherein forming a first insert receiving void comprises drilling of a first hole in a first end of said substrate and forming a second insert receiving void comprises drilling a second hole in a second end of said substrate, and inserting a first solid insert member comprises inserting a silica cylinder into said first hole, and securing said optical waveguide grating member to said first solid insert member comprises securing said optical waveguide grating member to said first solid insert member with a copper alumino silicate glass.

42. An optical waveguide device comprising an optical waveguide grating member held under a tension, said optical waveguide grating member bonded with a copper alumino silicate glass to a negative thermal expansion substrate.

43. An optical waveguide device as claimed in claim 42 wherein said negative thermal expansion substrate is comprised of a beta-eucryptite glass-ceramic.

44. An optical waveguide device as claimed in claim 42 wherein said negative thermal expansion substrate is comprised of a zirconium tungstate ceramic.

45. An optical waveguide device as claimed in claim 42 wherein said copper alumino silicate glass is comprised of 48–67% wt.$SiO_2$, 10–19% wt.$Al_2O_3$, 20–38% wt.CuO and 0–4% wt.$B_2O_3$.

46. A method of making an optical waveguide device, said method comprising providing an optical waveguide grating member; providing a longitudinal negative thermal expansion substrate having a first end and a second end; forming a centered channel in said negative thermal expansion substrate; abutting a first solid member adjacent to said first end and abutting a second solid member adjacent to said second end, said first solid member having a centered channel, said second solid member having a centered channel; tensioning said optical waveguide grating member; physically securing said optical waveguide grating member to said first solid member; adhering said grating member to said second solid member, wherein said negative thermal expansion substrate reduces the tensioning of said optical waveguide grating member in relationship to a temperature increase of said optical waveguide device.

* * * * *

UNITED STATES PATENT AND TRADEMARK OFFICE
CERTIFICATE OF CORRECTION

PATENT NO.   : 6,603,900 B1
DATED        : August 5, 2003
INVENTOR(S)  : Dana C. Bookbinder et al.

It is certified that error appears in the above-identified patent and that said Letters Patent is hereby corrected as shown below:

Column 10,
Line 60, insert -- 1. An optical waveguide device comprising of an optical -- instead of "1. An optical waveguide device comprising of all optical"

Column 11,
Line 60, insert -- 15. An optical waveguide device as claimed in claim 12 -- instead of "15. An optical waveguide device as claimed in claim 1"

Column 12,
Line 37, insert -- 21. An optical waveguide device as claimed in claim 20 -- instead of "21. An optic waveguide device as claimed in claim 20"

Signed and Sealed this

Third Day of February, 2004

JON W. DUDAS
*Acting Director of the United States Patent and Trademark Office*